United States Patent

[11] 3,542,045

| [72] | Inventors | Christian W. Kruckeberg;<br>John S. Loy, Fort Wayne; Lester R. Overy, Garrett, Indiana |
|---|---|---|
| [21] | Appl. No. | 724,399 |
| [22] | Filed | April 26, 1968 |
| [45] | Patented | Nov. 24, 1970 |
| [73] | Assignee | Tokheim Corporation<br>a corporation of Indiana |

[54] EMERGENCY SHUT-OFF VALVE
5 Claims, 5 Drawing Figs.

[52] U.S. Cl. ............................................. 137/39, 137/77
[51] Int. Cl. .............................................. F16k 17/36
[50] Field of Search .......................................... 137/38, 39, 67, 72, 73, 75—, 77; 25 1/66+

[56] References Cited
UNITED STATES PATENTS

| 2,640,491 | 6/1953 | MacBain | 137/75 |
| 2,965,116 | 12/1960 | Boone | 137/68X |
| 3,378,021 | 4/1968 | Milo | 137/68 |
| 3,396,739 | 8/1968 | Rosell | 137/39 |

*Primary Examiner*—William F. O'Dea
*Assistant Examiner*—Richard Gerard
*Attorneys*—Stan C. Kaiman and Edmund W. E. Kamm ABSTRACT: A shutoff valve having an operating lever of leaf-spring construction, the lever holding the valve open by engagement with a latch, but being biased toward disengagement and being releasable from the latch upon delivery to the valve of an undesired impact. The lever also includes a fusible connection to allow closing of the valve in event of fire.

Patented Nov. 24, 1970

3,542,045

INVENTORS
CHRISTIAN W. KRUCKEBERG
JOHN S. LOY
LESTER R. OVERY
BY: Stan C. Kaiman
THEIR ATTORNEY Patented Nov. 24, 1970

INVENTORS
CHRISTIAN W. KRUCKEBERG
JOHN S. LOY
LESTER R. OVERY
BY: *Stan C. Kaiman*
THEIR ATTORNEY 3,542,045

EMERGENCY SHUT-OFF VALVE

BACKGROUND OF THE INVENTION

In various fluid-flow applications where a valve is employed, it is desirable that the valve include provisions for automatic shutoff in the event of an impact which would damage the system in which the valve is employed. This is especially important in a system conveying gasoline or similar combustible fluids, where any damage involves a potential fire hazard as well as damage to the system and loss of product. For example, in remote pump pedestal dispensers commonly in use in gasoline service stations, a valve is located at the base of the pedestal in the supply line connecting the particular dispenser to the storage tanks. By appropriate design of such valve, the supply line may be closed at that point upon an undesirable impact—for example, from a vehicle—capable of damaging the dispenser and/or breaking the supply line, thus allowing escape of gasoline from the dispenser. Similarly, the design of the valve may be such that the valve is closed upon the occurrence of a fire in or adjacent the dispenser. Valves having these objectives are known in the art, and have previously been employed in similar installations; U.S. Pat. No. 2,965,116 issued Dec. 20, 1960, discloses one such valve.

The primary objection to the shutoff valves now in use is their relative complexity and attendant high cost. Accordingly, it is a principal object of this invention to provide a shutoff valve of the character described which is simple of manufacture and inexpensive in cost. It is a further object of this invention to provide such a valve which will automatically shutoff the flow through the system in which it is incorporated upon delivery to the valve of an impact of a particular amount, upon shearing of a specified section of the system in which the valve is employed, or upon the occurrence of a fire adjacent the valve.

SUMMARY OF THE INVENTION

A shutoff valve embodying this invention includes a body portion having a poppet valve pivotally mounted therein, the poppet valve being biased toward a closed position against a suitable valve seat in which position it may effectively block any flow through the valve. The poppet valve is normally held in an open position by a locking means which includes a unitary lever releasably engaging a stationary latch on a portion of the system separated from the body portion by a shear section. The lever is of a leaf-spring construction and is bent into engagement with the latch, whereby the lever is biased towards disengagement from the latch; disengagement is effected upon rupture of the shear section between the poppet valve and the latch, or upon delivery to the valve of an impact of a particular amount. Additionally, the lever includes a fusible connection, whereby upon application of excessive heat, as due to a fire adjacent the valve, the poppet valve may close independently of the action of the lever.

BRIEF DESCRIPTION OF THE DRAWINGS

Other objects and advantages will become apparent to those skilled in the art as a detailed description of an exemplary embodiment proceeds with reference to the drawings which form a part hereof, and in which.

DETAILED DESCRIPTION

Figure 1:
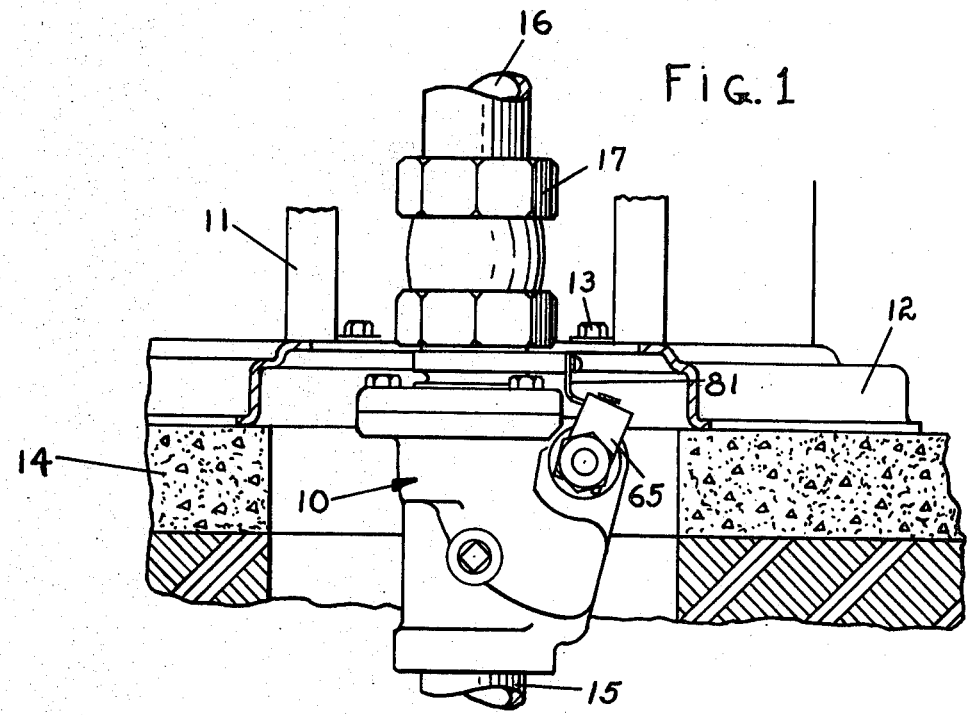
FIG. 1 is a side elevation of a portion of a system employing the valve of this invention.

Referring specifically to the drawings in which like numerals designate like parts, and initially to FIG. 1, there is illustrated a valve 10 in accordance with this invention situated within the base of a typical gasoline dispenser 11. The dispenser 11 is secured to a base 12 in any convenient manner, as by bolts 13, and rests upon a suitable foundation 14. Valve 10 is situated in a suitable aperture of the base 12, and joins a supply conduit 15 extending from a remote storage tank, not shown, to a conduit 16 which extends upwardly to the interior of the dispenser 11. Conduit 16 may be connected, for example, by a conduit connection 17.

Figure 2:
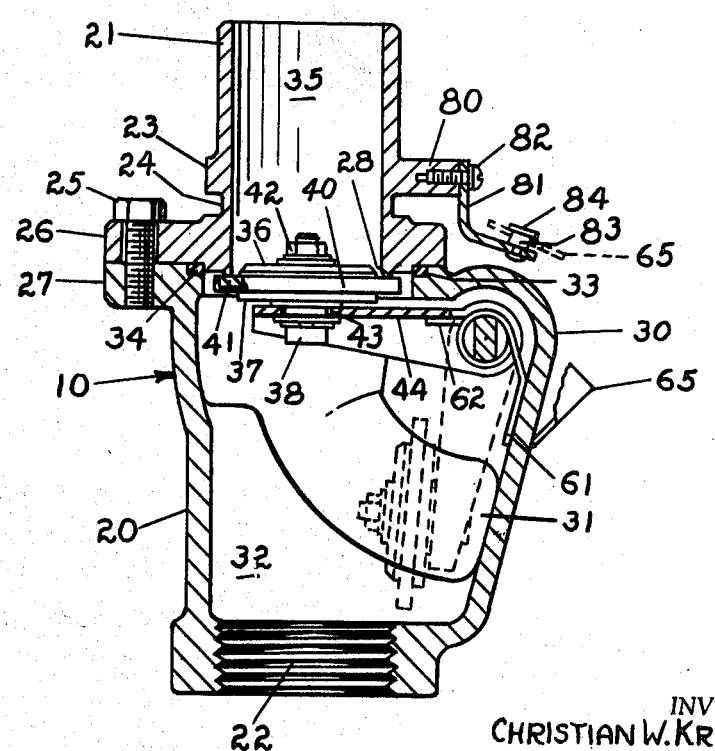
FIG. 2 is a vertical cross section of the valve shown in FIG. 1.

Referring now to FIG. 2, it will be seen that valve 10 in general includes a body portion 20 and an extension 21. The body portion 20 includes at its lower end an interiorly screw-threaded aperture 22, adapted to receive the conduit 15. Extension 21, at its upper end, is adapted to receive the conduit connection 17, and further includes a boss portion 23, and an exterior angular groove 24 constituting a shear section separating the extension 21 from the body portion 20. Extension 21 further includes at its lower end an annular, downwardly extending projection 28, for reasons to become evident shortly. The body portion 20 and extension 21 are secured together below the groove 24 as by a plurality of bolts 25 extending through matching flanges 26 and 27.

Body portion 20 comprises a substantially cylindrical hollow casing, with an enlarged hollow portion 30 at one side thereof constituting a chamber 31 offset from the main passage 32 through the body 20. Near the upper face of body 20 there is located an annular recess 33 in which is secured an annular ring-shaped sealing member 34. Thus, when in open position, valve 10 allows the uninhibited flow of a fluid through passage 32 of the body portion 20, thence through a passage 35 of the extension 21. Pivotally mounted within the body portion 20 is a poppet valve designated generally by 40. As is illustrated in solid lines in FIG. 2, the poppet valve 40 is so situated as to effectively block the flow of the fluid through the valve 10 by being seated against the projection 28 of extension 21. In its open position as shown in dotted lines, poppet valve 40 is withdrawn into the chamber 31, in a position such as not to inhibit the flow of fluid through passages 32 and 35.

Figure 3:
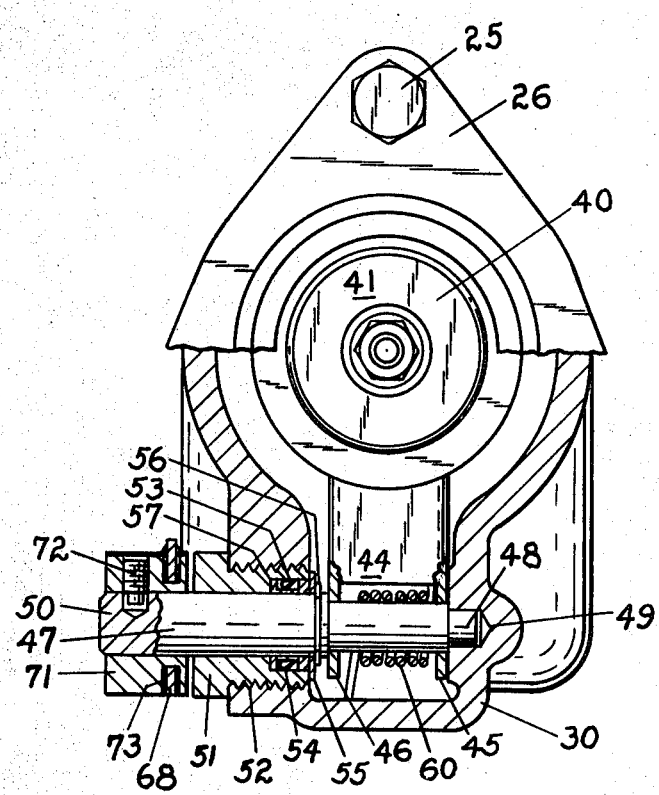
FIG. 3 is a top plan view of the valve shown in FIG. 1, a portion being shown in cross section to indicate the interior details.

Referring now to FIG. 3 as well as to FIG. 2, it will be seen that the poppet valve 40 includes a conventional poppet assembly including a poppet disc 41, of a suitable material resistant to gasoline, such as rubber. Poppet disc 41 is restrained between retaining discs 36 and 37 and is adapted to seat against the projection 28 of extension 21. The poppet disc 41 is connected in any desired fashion through an aperture 43 to a carrier member 44. As shown in FIG. 2, the connection illustrated employs a stem 38 passing through the aperture 43, retaining discs 36 and 37, and the poppet disc 41, the assembly being secured together by a nut 42 on the threaded end of stem 38.

As is shown more clearly in FIG. 3, carrier member 44 is attached at one end by bifurcated end portions 45 and 46 to a stem 47. Stem 47 passes through the portion 30 of body portion 20 and is secured at one end 48 in a suitable recess 49 of the portion 30. The opposite end 50 of stem 47 passes through a bearing 51 which is appropriately threaded into an opening 52 of portion 30. As shown, the mounting may further include a conventional O-ring 53 within an angular groove 54 of bearing 51, a washer 55 bearing against a retaining ring 56 mounted upon the stem 47. The O-ring 53 is preferably mounted about a compressible sealing ring 57, of Teflon for example, for forming an effective seal about stem 47. Mounted about the stem 47 between the bifurcated end portions 45 and 46 of carrier member 44, as shown in FIG. 3, is a coiled spring 60. As can be more clearly seen in FIG. 2, one end 61 of the spring 60 bears against an interior wall of the chamber 31 and the opposite end 62 bears against an underface of the carrier member 44. It will be appreciated that spring 60 functions to bias the poppet valve 40 to a closed position, as is shown in the solid lines in FIG. 2, while allowing pivoting of the poppet valve 40 to an open position, as is shown in dotted lines in FIG. 2.

Figure 4:
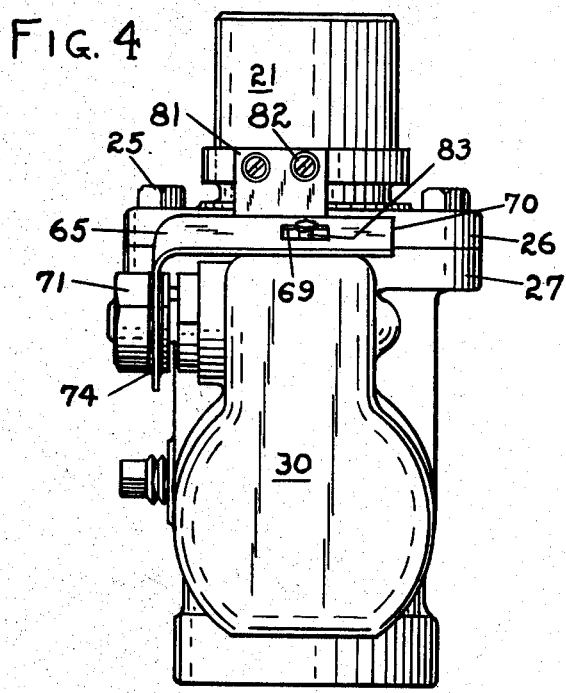
FIG. 4 is a side elevation of the valve shown in FIG. 1.
Figure 5:
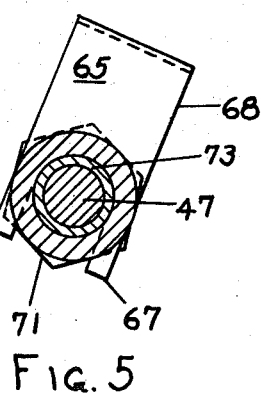
FIG. 5. is an elevation of the lever of this invention and the manner in which it is connected.

The poppet valve 40 is held in its open position by an operating lever 65 attached to the stem 47 outside the bearing 51, as is shown in FIG. 3. Referring momentarily to FIGS. 4 and 5, it will be seen that the operating lever 65 comprises a leaf spring bent into a substantially L-shaped configuration having a bifurcated portion forming mounting arms 66 and 67 at one end 68, and an aperture 69 adjacent the other end 70, for reasons to become evident shortly. Referring now to FIGS. 3 and 4, it will be appreciated that the operating lever 65 may be attached to the stem 47 by appropriate connection of the end at 68 to a nut 71 appropriately secured to shaft 47, as by a set screw 72. The end 68 is secured within an appropriate annular recess 73 of nut 71, as best seen in FIGS. 3 and 5, the mounting arms 66 and 67 being secured within the recess 73 by a suitable low-melting alloy 74, such as that identified as Belmont 02502. By appropriate choice of the alloy, the melting may occur at any desired predetermined temperature, for example, 160°F. It will thus be evident to those skilled in the art that upon excessive heat, as due to a fire in or adjacent the valve, the alloy 74 will melt, allowing the stem 47 to rotate under the influence of spring 60, thus allowing the poppet valve 40 to move from its open position to its closed position wholly independent of the action of the operating lever 65.

As can be seen in FIG. 1 and more clearly in FIG. 4, the operating lever 65 extends upwardly from its connection to the stem 47 toward the extension 21, then laterally across the enlarged portion 30 of body portion 20. Referring now to FIG. 2, mounted upon a lateral extension 80 of boss 23 is a bracket 81 secured to the lateral extension 80 at one end, as by screws 82. It will be noted that the bracket 81 is bent so that its opposite end lies adjacent the upper end of enlarged portion 30 of body 20. Suitably mounted upon this end of bracket 81 is a latch member 83 having an enlarged head portion 84.

Thus, after moving operating lever 65 to rotate poppet valve 40 from its closed to its open position, the lever 65 is bent downwardly until aperture 69 passes over the latch 83. Aperture 69 is of a configuration adapted to pass over the enlarged head portion 84 to effect engagement or disengagement and to be restrained under the enlarged head portion 84 during engagement.

Due to the spring leaf construction of the lever 65, it is biased towards disengagement from the latch 83, but held from such disengagement by the enlarged head portion 84 of latch 83 restraining the upper face of the lever 65 adjacent the aperture 69. Should, however, the lever 65 be rotated slightly to allow aperture 69 to pass over the enlarged head 84, the lever 65 will become disengaged from latch 83, allowing rotation of the poppet valve 40 under the influence of spring 60. Such disengagement may be caused by an impact being delivered to the valve 10, as for example, when the dispenser 11 is struck by a vehicle. By proper design of the lever 60 and aperture 69, disengagement may be effected upon an impact of any given amount. In practice, the valve is designed so that disengagement will be effected only upon an undesired impact which is of an amount sufficient to damage the system.

As shown, the lever 65 is thus connected to shaft 47 at a point substantially 90° around the circumference of the valve relative to the latch 73. It will be noted that the L-shaped configuration of lever 65 restrains its motion to positions closely adjacent the body portion 20. Such a feature is of substantial importance, in that the possibility of the valve being reopened after having been closed is prevented. For example, if the lever were not of an L-shaped configuration, it is possible that following separation from the latch, an interior wall of dispenser 11, as seen in FIG. 1, could serve to reopen the valve as such wall moved to the left in FIG. 1 after being broken away from the base 12.

It will be evident to those skilled in the art that if the extension 21 is separated from the body portion 20, as by being broken away along shear portion 24, the restraint of latch 83 will be destroyed, and lever 60 will be released in the same manner as indicated above in the event of an impact which fails to shear extension 21. It will thus be apparent that the poppet valve 40 may close on any one of three occurrences: (1) excessive heat causing the alloy 74 to melt, allowing the poppet to close independently of the action of lever 65, (2) the separation of extension 21 along shear portion 24, allowing rotation of lever 65, or (3) the disengagement of lever 65 from latch 83 upon sufficient impact to the valve 10.

We claim:

1. A shutoff valve comprising:
    A. a body portion including;
        1. a valve mounted therein,
        2. a valve seat,
        3. means biasing said valve to a closed position against said valve seat,
    B. an extension on said body portion, said extension being joined to said body portion by a weakened section adapted to allow said extension to be sheared from said body portion;
    C. locking means settable to hold said valve in an open position, but actuable to release said valve for movement to a closed position; and
    D. wherein the improvement comprises said locking means including a lever on said body bent into engagement with, but biased toward disengagement from, a stationary latch means on said extension, so that release will be effected upon a substantial impact being transmitted to said body portion or by said extension being sheared from said body section, thereby allowing said valve to move to a closed position.

2. A shutoff valve as set forth in claim 1 wherein said lever includes a fusible connection whereby, upon destruction of said fusible connection, said valve may pivot to a closed position independently of the engagement of said lever with said stationary latch means.

3. A shutoff valve as set forth in claim 1 wherein said lever is substantially L-shaped, whereby said lever during movement is confined to positions closely adjacent the exterior of said body portion.

4. A shutoff valve as set forth in claim 1 wherein:
    A. said stationary latch means comprises a pin member projecting from the periphery of said extension, said pin member having an enlarged head portion;
    B. said lever includes an aperture adjacent one end thereof, a said aperture being of a configuration adapted to pass over said enlarged head portion of said pin member to effect engagement or disengagement and to be restrained under said enlarged head portion during engagement; and
    C. said lever comprises a leaf spring normally biased toward disengagement from said latch means whereby, upon movement of said lever to a position allowing said aperture to pass over said enlarged head portion of said latch means, said lever becomes disengaged from said latch means.

5. A shutoff valve as set forth in claim 4 wherein said lever includes a bifurcated end portion operatively connected to said poppet valve by a fusible connection whereby, upon destruction of said fusible connection, said poppet valve may pivot to a closed position independently of said lever.